(12) United States Patent
Miyoshi et al.

(10) Patent No.: US 11,069,928 B2
(45) Date of Patent: *Jul. 20, 2021

(54) VEHICLE BATTERY DEVICE

(71) Applicant: Honda Motor Co., Ltd., Tokyo (JP)

(72) Inventors: Kyosuke Miyoshi, Saitama (JP); Satoshi Takada, Saitama (JP); Hideaki Sakai, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 139 days.

This patent is subject to a terminal disclaimer.

(21) Appl. No.: 16/522,622

(22) Filed: Jul. 25, 2019

(65) Prior Publication Data

US 2020/0058964 A1 Feb. 20, 2020

(30) Foreign Application Priority Data

Aug. 20, 2018 (JP) .............................. JP2018-154207

(51) Int. Cl.

| | |
|---|---|
| *H01M 10/48* | (2006.01) |
| *G05D 23/185* | (2006.01) |
| *H01M 6/50* | (2006.01) |
| *H01M 50/138* | (2021.01) |
| *H01M 50/256* | (2021.01) |

(52) U.S. Cl.
CPC ........ *H01M 10/482* (2013.01); *G05D 23/185* (2013.01); *H01M 6/5038* (2013.01); *H01M 50/138* (2021.01); *H01M 50/256* (2021.01)

(58) Field of Classification Search
CPC .......... B60L 50/66; B60L 58/26; B60L 58/27; G05D 23/185; H01M 10/482; H01M 10/625; H01M 10/647; H01M 10/6555; H01M 10/6556; H01M 10/6567; H01M 50/138; H01M 50/20; H01M 50/256; H01M 6/5038; Y02E 60/10; Y02T 10/70
See application file for complete search history.

(56) References Cited

U.S. PATENT DOCUMENTS

2018/0034014 A1* 2/2018 Ichikawa ................ B60L 50/66

FOREIGN PATENT DOCUMENTS

JP 2008159439 7/2008

* cited by examiner

*Primary Examiner* — Victoria H Lynch
(74) *Attorney, Agent, or Firm* — JCIPRNET

(57) ABSTRACT

Provided is a vehicle battery device in which number of battery cells can be easily increased, a large number of battery cells can be arranged at high density, and connection with the outside can also be easily performed. The vehicle battery device includes: a battery cell mounting part accommodating a battery cell group constituted by a plurality of laminated battery cells; and an interface box integrating connection functions between the battery cell mounting part and the outside, wherein the battery cell mounting part is connected to at least one of two opposing side surfaces in an outer surface of the interface box; and the interface box has, on any outer surface other than the side surface connected with the battery cell mounting part, a connection part capable of connecting the interface boxes to each other.

19 Claims, 14 Drawing Sheets

VEHICLE BATTERY DEVICE

CROSS-REFERENCE TO RELATED APPLICATION

This application claims the priority benefit of Japan Application No. 2018-154207, filed on Aug. 20, 2018. The entirety of the above-mentioned patent application is hereby incorporated by reference herein and made a part of this specification.

BACKGROUND

Technical Field

The disclosure relates to a vehicle battery device.

Related Art

A hybrid car or an electric car is equipped with a battery device having a battery cell such as a lithium ion secondary battery or the like. In general, since these vehicles require more power than conventional gasoline cars, a large number of battery cells are arranged in the battery device (e.g., see Patent Document 1).

In a battery device, it is desired that a large number of battery cells can be easily mounted at high density in limited space in a vehicle in order to meet the high power requirement, and that connection with the outside can be easily performed.

PATENT DOCUMENTS

Patent Document 1: Japanese Laid-open No. 2008-159439

SUMMARY

A vehicle battery device according to the disclosure is a vehicle battery device (e.g., later-described vehicle battery device 1) including a battery cell mounting part (e.g., later-described battery cell mounting part 3) accommodating a battery cell group (e.g., later-described battery cell group 6) constituted by a plurality of laminated battery cells (e.g., later-described battery cells 60), and an interface box (e.g., later-described interface box 2) integrating connection functions between the battery cell mounting part and the outside, wherein the battery cell mounting part is connected to at least one of two opposing side surfaces (e.g., later-described side surfaces 201a) in an outer surface of the interface box; and the interface box has, on any of the outer surface other than the side surface connected with the battery cell mounting part, a connection part capable of connecting the interface boxes to each other.

DESCRIPTION OF THE EMBODIMENTS

Figure 1:
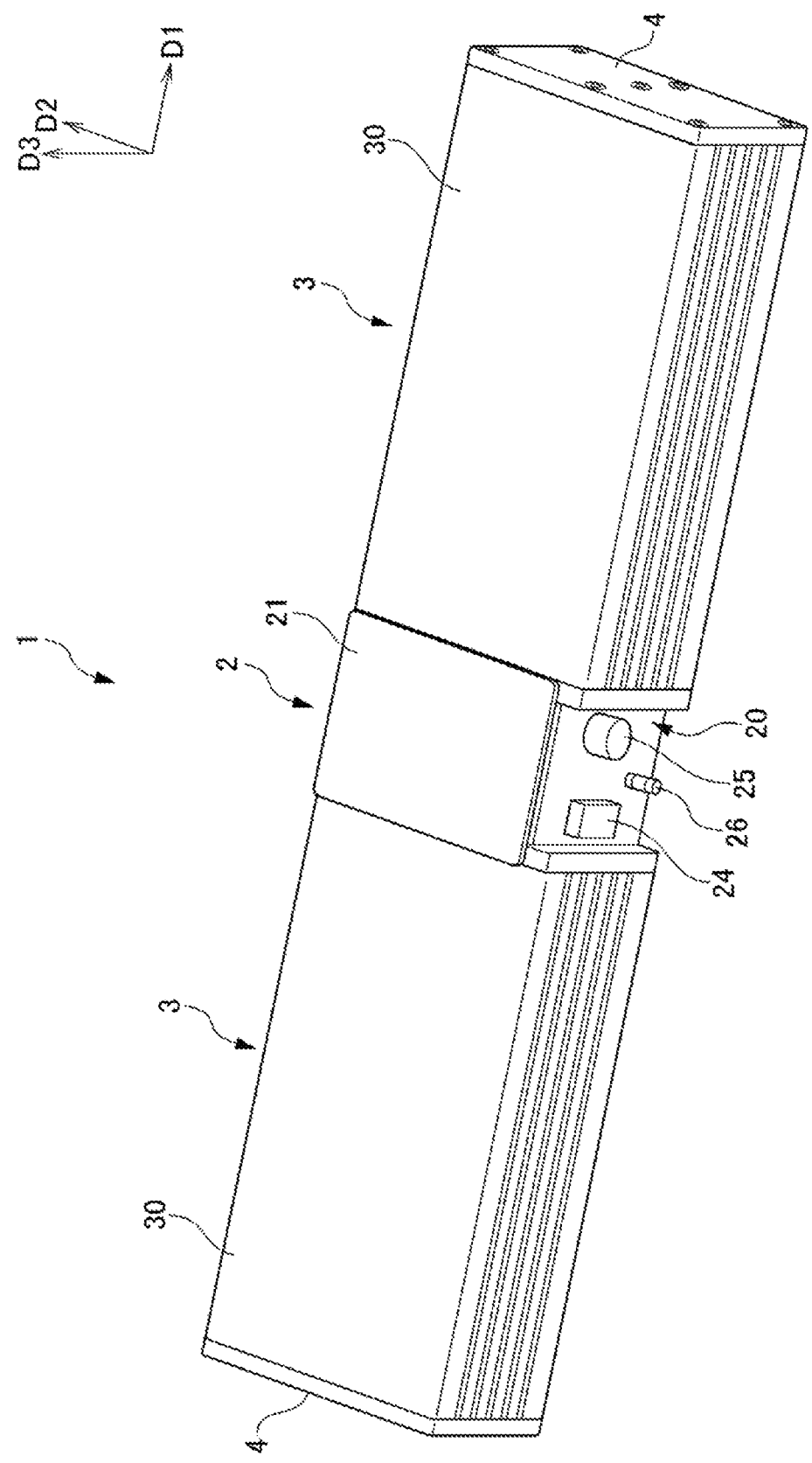
FIG. 1 is a perspective view showing an embodiment of a vehicle battery device according to the disclosure.

The disclosure provides a vehicle battery device in which number of battery cells can be easily increased, a large number of battery cells can be arranged at high density, and connection with the outside can also be easily performed.

(1) A vehicle battery device according to the disclosure is a vehicle battery device (e.g., later-described vehicle battery device 1) including a battery cell mounting part (e.g., later-described battery cell mounting part 3) accommodating a battery cell group (e.g., later-described battery cell group 6) constituted by a plurality of laminated battery cells (e.g., later-described battery cells 60), and an interface box (e.g., later-described interface box 2) integrating connection functions between the battery cell mounting part and the outside, wherein the battery cell mounting part is connected to at least one of two opposing side surfaces (e.g., later-described side surfaces 201a) in an outer surface of the interface box; and the interface box has, on any of the outer surface other than the side surface connected with the battery cell mounting part, a connection part capable of connecting the interface boxes to each other.

According to the vehicle battery device described in (1) above, the interface boxes can be easily connected to each other by the connection part, and number of the battery cell mounting part in which a plurality of battery cells are laminated can be easily increased. Accordingly, the number of the battery cells can be easily increased, and a large number of battery cells can be arranged at high density. In addition, by the interface box, connection with the outside can be easily performed.

(2) In the vehicle battery device described in (1), the interface box may have, on any of the outer surface other than the side surface connected with the battery cell mounting part, an interface part (e.g., later-described low voltage connector 24, high voltage connector 25 and temperature control solution connector 26) for connection with the outside, wherein the connection part may be constituted by the interface part.

According to the vehicle battery device described in (2) above, since the interface part of the interface box is also used as the connection part, there is no need to separately provide the connection part, and the configuration of the vehicle battery device can be simplified.

(3) In the vehicle battery device described in (2), the interface box may have, on any of the outer surface other than the side surface connected with the battery cell mounting part, a positioning mechanism (e.g., later-described positioning mechanism 208) separate from the interface part and for positioning the interface boxes.

According to the vehicle battery device described in (3) above, since the positioning mechanism enables positioning at the time of connecting the interface boxes, it becomes easier to connect the interface boxes to each other. Moreover, since the positioning mechanism is separate from the connection part, a load applied to the connection part at the time of connection can be reduced.

(4) In the vehicle battery device described in (3), the positioning mechanism may be provided more protruding than the interface part in a connection direction of the interface boxes.

According to the vehicle battery device described in (4) above, since the positioning mechanism can be contacted earlier than the connection part when the interface boxes are connected to each other, there is no risk of applying a load to the connection part, and the connection operation can be more smoothly performed.

(5) In the vehicle battery device described in any one of (2) to (4), the battery cell mounting part may have a temperature control solution passage (e.g., later-described temperature control solution passage 36) through which a temperature control solution circulates along a lamination direction of the battery cells; the interface part may include a power interface part (e.g., the later-described low voltage connector 24 and high voltage connector 25) transmitting and receiving electricity and a temperature control solution interface part (the temperature control solution connector 26) transmitting and receiving the temperature control solution; the battery cell group of the battery cell mounting part may be electrically connected to the power interface part; and the temperature control solution passage of the battery cell mounting part may be connected to the temperature control solution interface part so as to be capable of circulating the temperature control solution.

According to the vehicle battery device described in (5) above, since the electrical function of the laminated battery cells accommodated in the battery cell mounting part and the circulation function of the temperature control solution are integrated in the interface box, a compact configuration can be achieved; also, since all the connections with the outside can be performed via the interface box, connection with the outside also becomes easy.

(6) In the vehicle battery device described in (5), the temperature control solution interface part may be arranged below the power interface part or in a position spaced apart from the power interface part in a horizontal direction.

According to the vehicle battery device described in (6) above, even if a liquid leakage occurs in the temperature control solution interface part, the risk that the leaked temperature control solution falls on the power interface part can be reduced.

(7) In the vehicle battery device described in any one of (1) to (6), the battery cell mounting part may have an end plate (e.g., later-described end plate 4) on an end surface (e.g., later-described end surface 30*b*) opposite an end surface (e.g., later-described end surface 30*a*) connected to the interface box; and the battery cell group of the battery cell mounting part may be compressed and sandwiched between the side surface of the interface box and the end plate in the lamination direction of the battery cells.

According to the vehicle battery device described in (7) above, since the side surface of the interface box functions as the end plate arranged at one end of the battery cell group, the end plate can be reduced. In addition, since the end plate can be reduced, the vehicle battery device can be configured more compactly.

(8) In the vehicle battery device described in (7), the side surface of the interface box connected with the battery cell mounting part may be a flat surface.

According to the vehicle battery device described in (8) above, since the side surface of the interface box connected with the battery cell mounting part is a flat surface, the battery cell group can be stably compressed and sandwiched between the interface box and the end plate.

(9) In the vehicle battery device described in (7) or (8), the end plate may have a return passage of the temperature control solution passage that communicates with the temperature control solution passage of the battery cell mounting part.

According to the vehicle battery device described in (9) above, since the temperature control solution can be circulated by using the end plate, temperature control efficiency can be further improved.

(10) In the vehicle battery device described in any one of (1) to (9), the side surface of the interface box connected with the battery cell mounting part may have, separately, an electrical wiring opening (e.g., later-described electrical wiring opening 205) through which an electrical wire provided over between the battery cell mounting part and the interface box can be inserted, and a temperature control solution opening (e.g., later-described temperature control solution opening 206) communicable with the temperature control solution passage of the battery cell mounting part.

According to the vehicle battery device described in (10) above, since the electrical wire from the battery cell mounting part and the temperature control solution can be communicated to the interface box through the side surface of the interface box, there is no need to separately provide wires or pipes for the above communication outside the interface box or the battery cell mounting part.

(11) In the vehicle battery device described in (10), the temperature control solution opening may be provided in a position corresponding to one end part of the temperature control solution passage of the battery cell mounting part.

According to the vehicle battery device described in (11) above, only by connecting the battery cell mounting part to the side surface of the interface box, the position of the temperature control solution opening on the side surface can match the position of the one end part of the temperature control solution passage of the battery cell mounting part. Thus, connection for circulating the temperature control solution between the interface box and the temperature control solution passage can be easily performed.

(12) In the vehicle battery device described in (10) or (11), the battery cell mounting part may have above the battery cell group a space part (e.g., later-described space part S) in which the electrical wire can be arranged; and the electrical wiring opening may be provided in a position corresponding to the space part of the battery cell mounting part.

According to the vehicle battery device described in (12) above, the electrical wire between the battery cell mounting part and the interface box can be easily arranged.

(13) In the vehicle battery device described in any one of (1) to (12), a beam part (e.g., later-described beam part 207) extending between the two opposing side surfaces may be provided inside the interface box.

According to the vehicle battery device described in (13) above, strength of the interface box along a connection direction of the battery cell mounting part is enhanced.

(14) In the vehicle battery device described in (13), the beam part may be arranged in a position corresponding to a central part of the battery cell group in the battery cell mounting part in a width direction.

According to the vehicle battery device described in (14) above, by the beam part, durability against stress applied to the side surface of the interface box due to expansion of the battery cell can be improved.

(15) In the vehicle battery device described in any one of (1) to (14), the interface box may have, between the two opposing side surfaces, a fragile part (e.g., later-described fragile part 209) that is broken or deformed preferentially to the battery cell mounting part when a load of a certain magnitude or greater acts from the outside.

According to the vehicle battery device described in (15) above, when a collision load or the like acts on the interface box along the connection direction of the battery cell mounting part, since the interface box is broken or deformed preferentially at the fragile part, the battery cell accommodated in the battery cell mounting part can be protected.

(16) In the vehicle battery device described in (15), the fragile part may be a concave part (e.g., later-described concave part 2a) through which a vehicle wire or pipe can be inserted.

According to the vehicle battery device described in (16) above, since the vehicle wire or pipe can be inserted through the concave part, utilization efficiency of vehicle space can be enhanced.

(17) In the vehicle battery device described in any one of (1) to (16), the battery cell mounting part may be connected to each of the two opposing side surfaces of the interface box.

According to the vehicle battery device described in (17) above, since a plurality of battery cell mounting parts are connected to one interface box, a large number of battery cells can be efficiently arranged.

According to the disclosure, a vehicle battery device can be provided in which number of battery cells can be easily increased, a large number of battery cells can be arranged at high density, and connection with the outside can also be easily performed.

Hereinafter, an example of an embodiment of the disclosure will be explained in detail with reference to the drawings.

Figure 2:
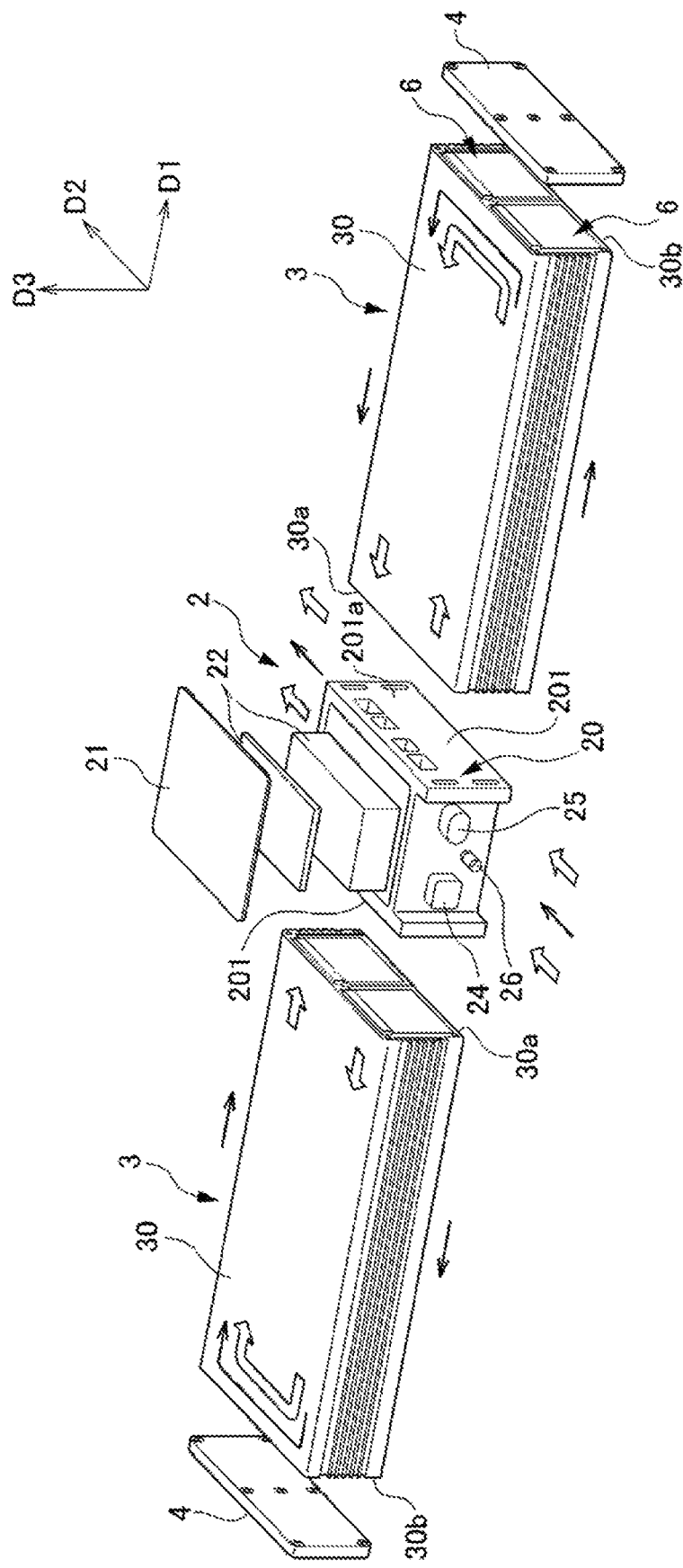
FIG. 2 is an exploded perspective view of the vehicle battery device shown in FIG. 1.

As shown in FIG. 1 and FIG. 2, a vehicle battery device 1 shown in the present embodiment includes one interface box 2 (hereinafter referred to as I/F box 2) and two battery cell mounting parts 3 and 3. Moreover, among directions indicated by arrows in the drawings of the present specification, a direction along direction D1 indicates a length direction of the vehicle battery device 1. A direction along direction D2 indicates a width direction of the vehicle battery device 1. A direction along direction D3 indicates a height direction of the vehicle battery device 1. The direction D3 indicates "above" of the vehicle battery device 1, and an opposite direction thereto indicates "below" of the vehicle battery device 1.

In the vehicle battery device 1, the I/F box 2 is arranged in a central part, and the battery cell mounting parts 3 and 3 are respectively arranged on both sides of the I/F box 2 along the direction D1. The battery cell mounting parts 3 and 3 include an exterior body 30 and a battery cell group 6. The battery cell group 6 is accommodated in the exterior body 30.

End plates 4 and 4 are each arranged on an end surface 30b of the exterior body 30 on a side of each of the battery cell mounting parts 3 and 3 far from the I/F box 2. Although not shown in detail, the two battery cell mounting parts 3 and 3 may be, for example, integrally fastened by a plurality of long bolts inserted throughout the battery cell mounting parts 3 and 3 and the I/F box 2, or may be welded to the I/F box 2. The end plate 4 is fixed to the end surface 30b of the exterior body 30 of the battery cell mounting part 3 by a bolt (not shown).

The I/F box 2 accommodates a component 22 such as a supply passage component of a temperature control medium to the battery cell mounting parts 3 and 3, a power distribution component, an electronic control unit (ECU) and the like. Specifically, as shown in FIG. 2, the I/F box 2 has a box body 20 and a cover body 21 covering an upper surface of the box body 20, and accommodates the component 22 inside the box body 20. The cover body 21 is fixed to the upper surface of the box body 20 by a bolt (not shown) or the like.

The box body 20 is a container made of a rigid body such as aluminum, aluminum alloy or the like and having a rectangular shape in a plan view, having two sidewall parts 201 and 201 opposing each other along the direction D1, two sidewall parts 202 and 203 opposing each other along the direction D2, and a bottom wall part 204. The two parallel sidewall parts 201 and 201 of the box body 20 facing the direction D1 are respectively arranged on sides connected with the battery cell mounting parts 3 and 3. In an outer surface of the I/F box 2, two opposing side surfaces 201a and 201a of the I/F box 2 to which the battery cell mounting parts 3 and 3 are connected are constituted by outer surfaces of the sidewall parts 201 and 201.

In the vehicle battery device 1 shown in the present embodiment, the sidewall parts 201 and 201 function as other end plates for compressing and sandwiching, together with the end plates 4 and 4, the later-described battery cell groups 6 and 6 accommodated in the battery cell mounting parts 3 and 3 from both sides. Hence, the sidewall parts 201 and 201 have a thickness sufficient to withstand a large tightening load. In addition, since one battery cell mounting part 3 requires only one end plate 4, the end plate 4 can be reduced. Since the end plate 4 can be reduced, the vehicle battery device 1 can correspondingly be configured compactly.

The side surfaces 201a and 201a of the sidewall parts 201 and 201 are regarded as flat surfaces. Hence, the battery cell group 6 accommodated in the battery cell mounting part 3 can be stably compressed and sandwiched between the I/F box 2 and the end plate 4.

Figure 4:
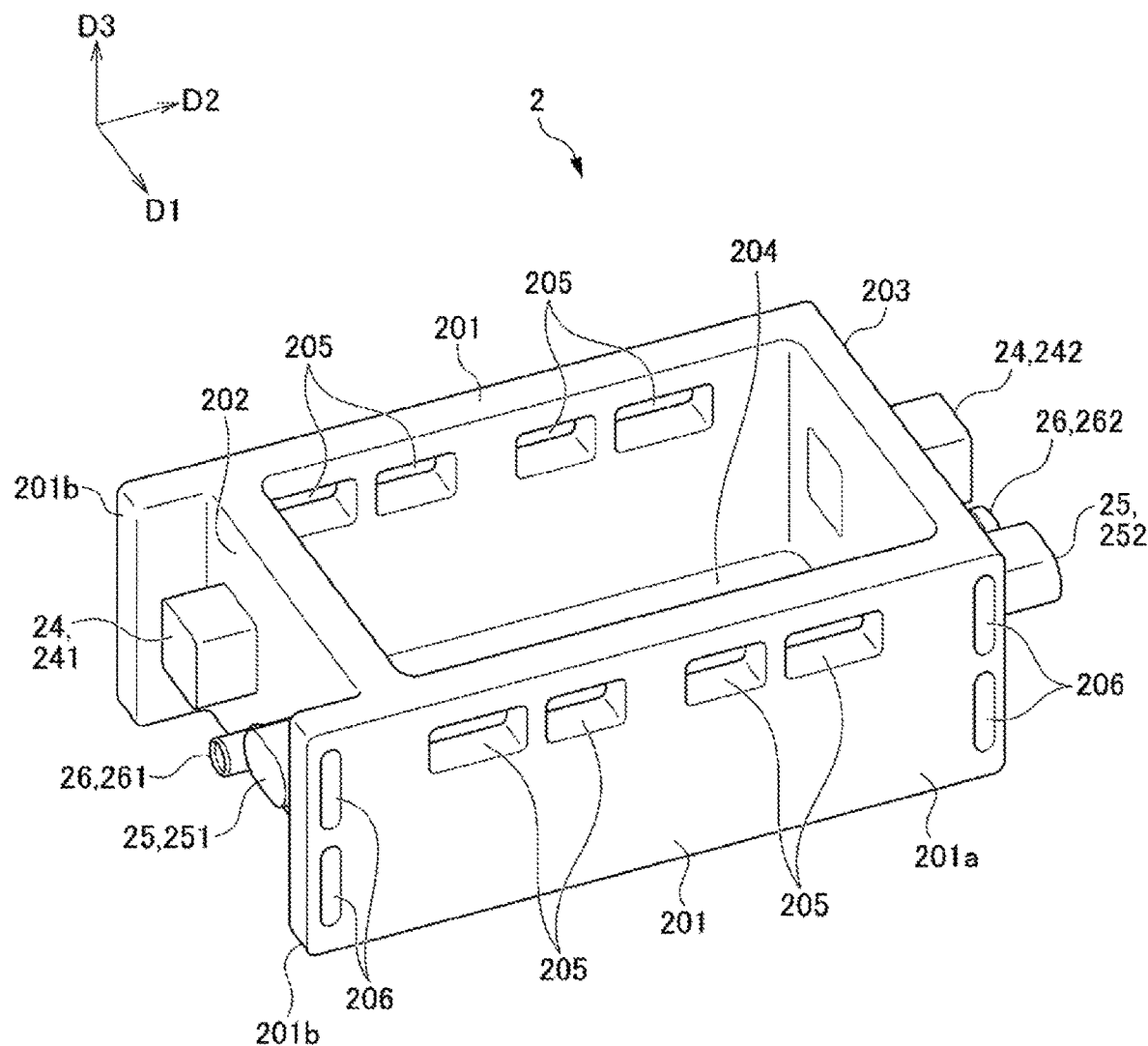
FIG. 4 is a perspective view showing an I/F box in a vehicle battery device.
Figure 5:
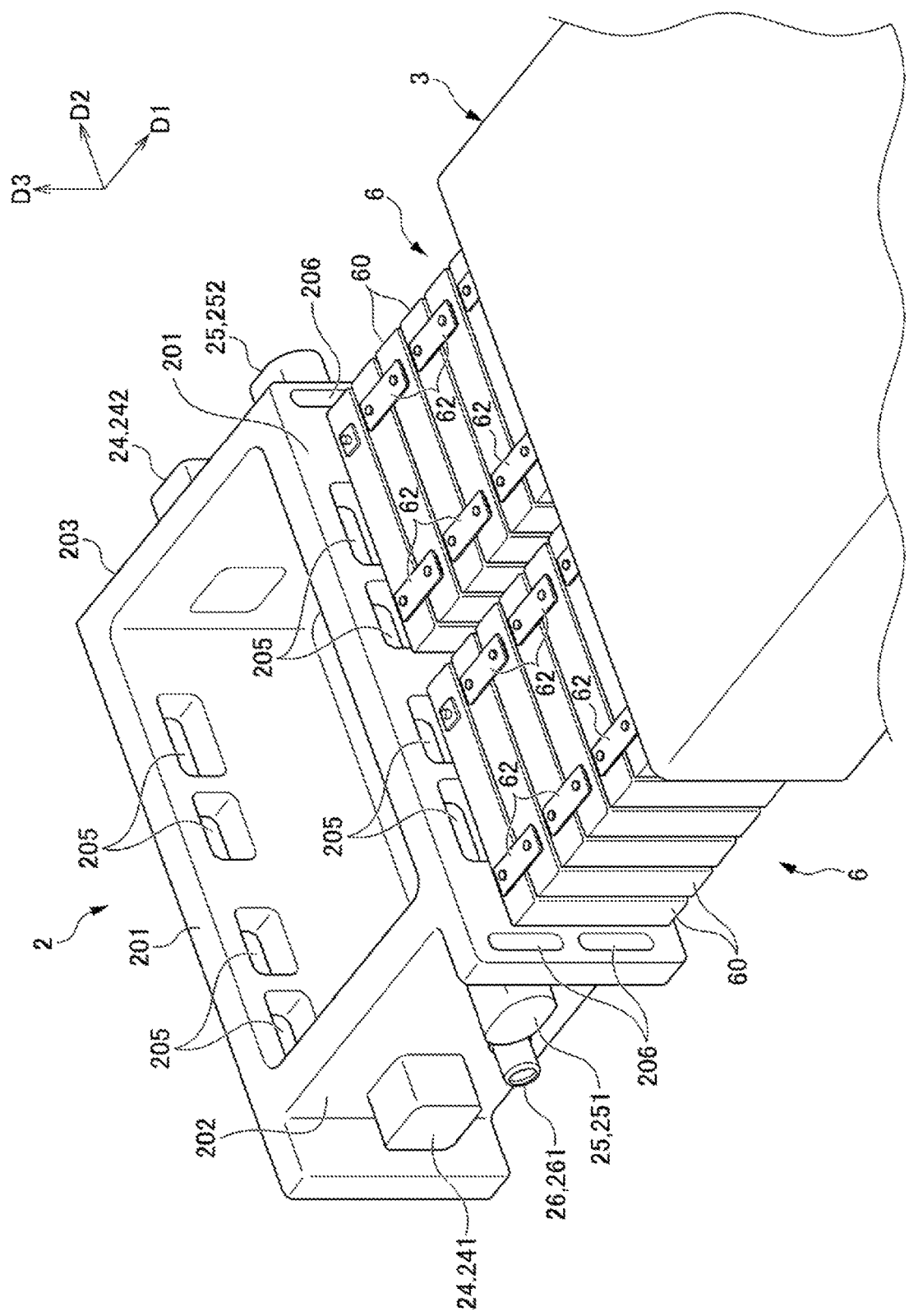
FIG. 5 is a perspective view showing an arrangement relationship between an I/F box and a battery cell of a battery cell mounting part.

As shown in FIG. 4 and FIG. 5, a plurality of electrical wiring openings 205 and a plurality of temperature control solution openings 206 are respectively separately provided in each of the sidewall parts 201 and 201 of the I/F box 2. The electrical wiring openings 205 are openings through which electrical wires (not shown) extending from the battery cell groups 6 and 6 in the battery cell mounting parts 3 and 3 can be inserted so as to be electrically connected to a power collection/distribution part of the component 22 in the I/F box 2. The electrical wiring openings 205 penetrate the sidewall part 201 and face the inside of the I/F box 2. Meanwhile, the temperature control solution openings 206 are openings communicable with a later-described temperature control solution passage 36 of the battery cell mounting part 3. The temperature control solution openings 206 pass through the inside of the sidewall part 201 and face the inside of the I/F box 2.

By providing the I/F box 2 with the electrical wiring openings 205 and the temperature control solution openings 206, the electrical wires from the battery cell mounting part 3 and the temperature control solution can be communicated to the inside of the I/F box 2 through the side surface 201a of the I/F box 2. Therefore, since there is no need to separately provide wires or pipes for communication of the electrical wires and the temperature control solution outside the I/F box 2 or the battery cell mounting part 3, the vehicle battery device 1 can be made compact.

The electrical wiring openings 205 and the temperature control solution openings 206 are arranged in positions covered by the battery cell mounting parts 3 and 3 when the battery cell mounting parts 3 and 3 are respectively connected to the side surfaces 201a and 201a of the I/F box 2. Specifically, as shown in FIG. 5, the electrical wiring openings 205 are provided in positions corresponding to a space part S formed above the battery cell group 6 of the battery cell mounting part 3. The space part S is a space part in which the electrical wires of the battery cell group 6 are arranged, and is formed between above of the battery cell group 6 and the exterior body 30. Hence, the electrical wires between the battery cell mounting part 3 and the I/F box 2 can be easily arranged.

Figure 3:
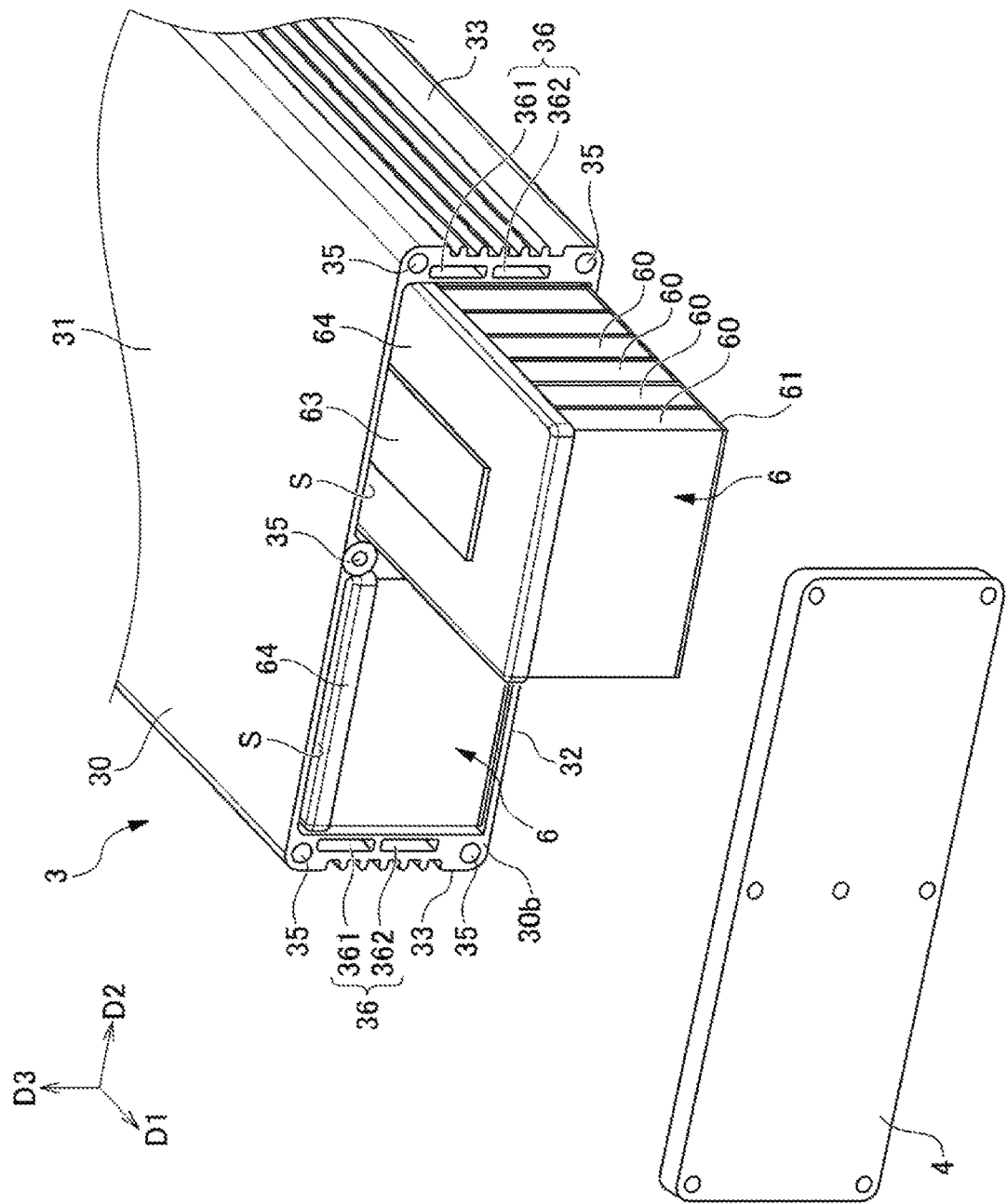
FIG. 3 is an exploded perspective view showing principal parts of a battery cell mounting part in a vehicle battery device.

Meanwhile, as shown in FIG. 3, the temperature control solution openings 206 are provided in positions corresponding to one end part of the temperature control solution passage 36 of the exterior body 30 of the battery cell mounting part 3. The one end part of the temperature control solution passage 36 opens on an end surface 30a of the exterior body 30 near the I/F box 2. Accordingly, only by connecting the battery cell mounting part 3 to the side surface 201a of the I/F box 2, the positions of the temperature control solution openings 206 on the side surface 201a can match the position of the one end part of the temperature control solution passage 36 of the battery cell mounting part 3. Thus, connection for circulating the temperature control solution between the I/F box 2 and the temperature control solution passage 36 can be easily performed.

In the I/F box 2, a low voltage connector 24, a high voltage connector 25 and a temperature control solution connector 26 project from the two sidewall parts 202 and 203 of the box body 20 facing the direction along the direction D2. The low voltage connector 24 and the high voltage connector 25 are connectors transmitting and receiving electricity, and are electrically connected to the power collection/distribution part of the component 22. The low voltage connector 24 and the high voltage connector 25 constitute a power interface part in the I/F box 2 in the disclosure. This power interface part performs transmission and reception of not only power but also a signal system (communication system). In addition, the temperature control solution connector 26 is a connector transmitting and receiving the temperature control solution, is arranged between the low voltage connector 24 and the high voltage connector 25, and communicates with the later-described temperature control solution passage 36 of the battery cell mounting parts 3 and 3 respectively via the temperature control solution openings 206. The temperature control solution connector 26 constitutes a temperature control solution interface part in the I/F box 2 in the disclosure.

Figure 6:
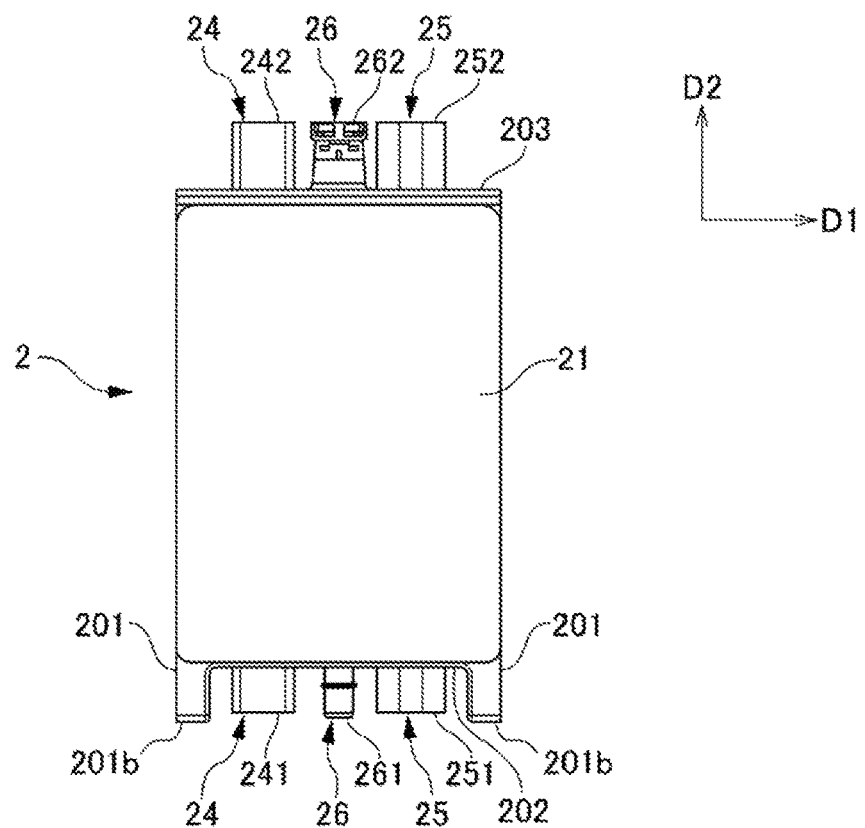
FIG. 6 is a plan view showing an I/F box in a vehicle battery device.
Figure 7:
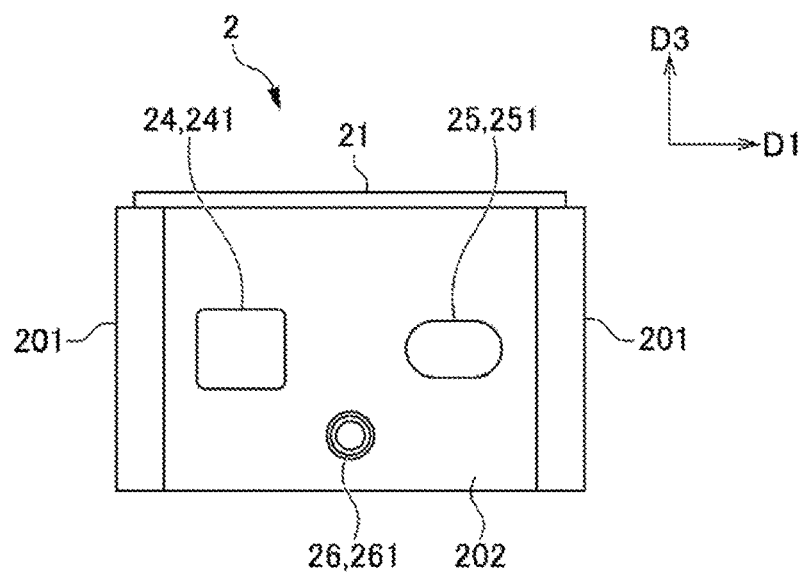
FIG. 7 is a front view of an I/F box.
Figure 8:
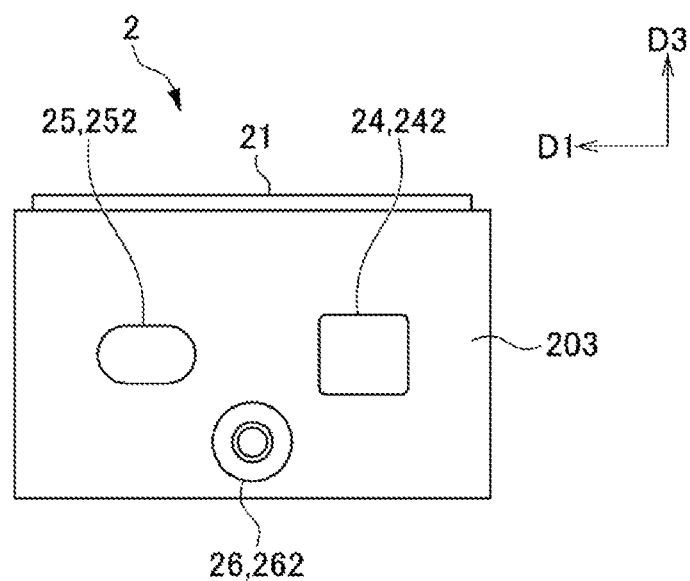
FIG. 8 is a back view of an I/F box.

As shown in FIG. 6 to FIG. 8, the low voltage connector 24 arranged on the sidewall part 202 being one (front side) of the two sidewall parts 202 and 203 is a male connector 241, and the low voltage connector 24 arranged on the sidewall part 203 on the other side (back side) is a female connector 242. Similarly, the high voltage connector 25 arranged on the sidewall part 202 on the one side is a male connector 251, and the high voltage connector 25 arranged on the sidewall part 203 on the other side is a female connector 252. Further, similarly, the temperature control solution connector 26 arranged on the sidewall part 202 on the one side is a male connector 261, and the temperature control solution connector 26 arranged on the sidewall part 203 on the other side is a female connector 262. The male connectors 241, 251, 261 and the female connectors 242, 252, 262 have complementary connectable structures.

As shown in FIG. 7 and FIG. 8, the low voltage connectors 24 and 24 and the high voltage connectors 25 and 25 on the both sidewall parts 202 and 203 are arranged at the same height along the direction D3. Meanwhile, the temperature control solution connectors 26 and 26 on the both sidewall parts 202 and 203 are arranged below the low voltage connectors 24 and 24 and the high voltage connectors 25 and 25. Hence, even if a liquid leakage occurs in the temperature control solution connector 26, the risk that the leaked temperature control solution falls on the low voltage connector 24 and the high voltage connector 25 can be reduced.

For the same purpose, the temperature control solution connectors 26 and 26 may be arranged in positions spaced apart from the low voltage connectors 24 and 24 and the high voltage connectors 25 and 25 in a horizontal direction (direction D1) to such an extent that the leaked temperature control solution does not fall on the low voltage connector 24 and the high voltage connector 25. To further reliably prevent a liquid leakage, a check valve (not shown) for preventing outflow of the temperature control solution from the I/F box 2 to the outside may be provided at the temperature control solution connector 26.

The two battery cell mounting parts 3 and 3 are arranged on both sides of the I/F box 2 with the I/F box 2 sandwiched therebetween. Since the two battery cell mounting parts 3 and 3 have the same structure, the configuration of one battery cell mounting part 3 is explained here with reference to FIG. 1 to FIG. 9. The battery cell mounting part 3 mainly has the exterior body 30, and the battery cell group 6 accommodated in the exterior body 30. Accordingly, since a later-described plurality of battery cells 60 that constitute the battery cell group 6 are arranged on both sides of the I/F box 2 with the I/F box 2 sandwiched therebetween, a large number of battery cells 60 can be efficiently arranged. The battery cell mounting part 3 shown in the present embodiment has two battery cell groups 6 and 6 arranged in parallel in the exterior body 30. However, there may be only one battery cell group 6 arranged in one exterior body 30.

The exterior body 30 shown in the present embodiment is formed of a rigid body such as aluminum, aluminum alloy or the like into a quadrangular cylindrical shape. Both ends of the exterior body 30 in a length direction (direction along the direction D1) respectively open in a horizontally long rectangular shape. The exterior body 30 has an upper wall 31, a lower wall 32, and two sidewalls 33 and 33. As shown in FIG. 3, the end surface 30b of the exterior body 30 has an appropriate number of bolt insertion holes 35 for fixing the end plate 4 with bolts.

The temperature control solution passages 36 and 36 through which the temperature control solution circulates are respectively provided in the two sidewalls 33 and 33. The temperature control solution passage 36 in each sidewall 33 is divided into two passages, namely, an upper passage 361 arranged at a higher level and a lower passage 362 arranged at a lower level. The upper passage 361 and the lower passage 362 extend over an entire length of the exterior body 30 in the length direction (direction D1) and respectively open on both end surfaces 30a and 30b of the exterior body 30. The end part of the temperature control solution passage 36 near the I/F box 2 communicates with the temperature control solution opening 206 that opens on the sidewall part 201 of the I/F box 2, and communicates with the inside of the I/F box 2 via the temperature control solution opening 206. Inside the I/F box 2, the temperature control solution passage 36 communicates with the temperature control solution connector 26.

As the temperature control solution, in general, a coolant for cooling the later-described battery cells that constitute the battery cell group 6 is used. However, a liquid heated to a predetermined temperature for heating the battery cell can also be used if necessary. Although the temperature control solution passage 36 shown in the present embodiment is completely embedded inside the sidewall 33 of the exterior body 30, the temperature control solution passage 36 may be constituted by, for example, a groove recessed from the outside of the sidewall 33. In this case, by covering the groove from the outside of the sidewall 33 with a plate or the like, a passage through which the temperature control solution can circulate is configured inside the sidewall 33. The temperature control solution passage 36 may be formed of a thermally conductive pipe. In this case, by embedding the pipe in or fixing the pipe to the sidewall 33 in a heat exchangeable manner, the sidewall 33 in which the temperature control solution passage 36 is provided is configured.

The cylindrical exterior body 30 shown in the present embodiment is formed in the same shape along the direction D1. Hence, the exterior body 30 can be constituted by an extrusion-molded product extrusion-molded along the direction D1. Accordingly, the exterior body 30 can be easily formed. In addition, since the cylindrical exterior body 30 constituted by the extrusion-molded product does not have a joint part in which plate materials are joined to each other, assembly variation or thermal distortion arising from the joint part does not occur. Hence, the vehicle battery device 1 having the exterior body 30 whose shape is stable can be configured.

Figure 9:
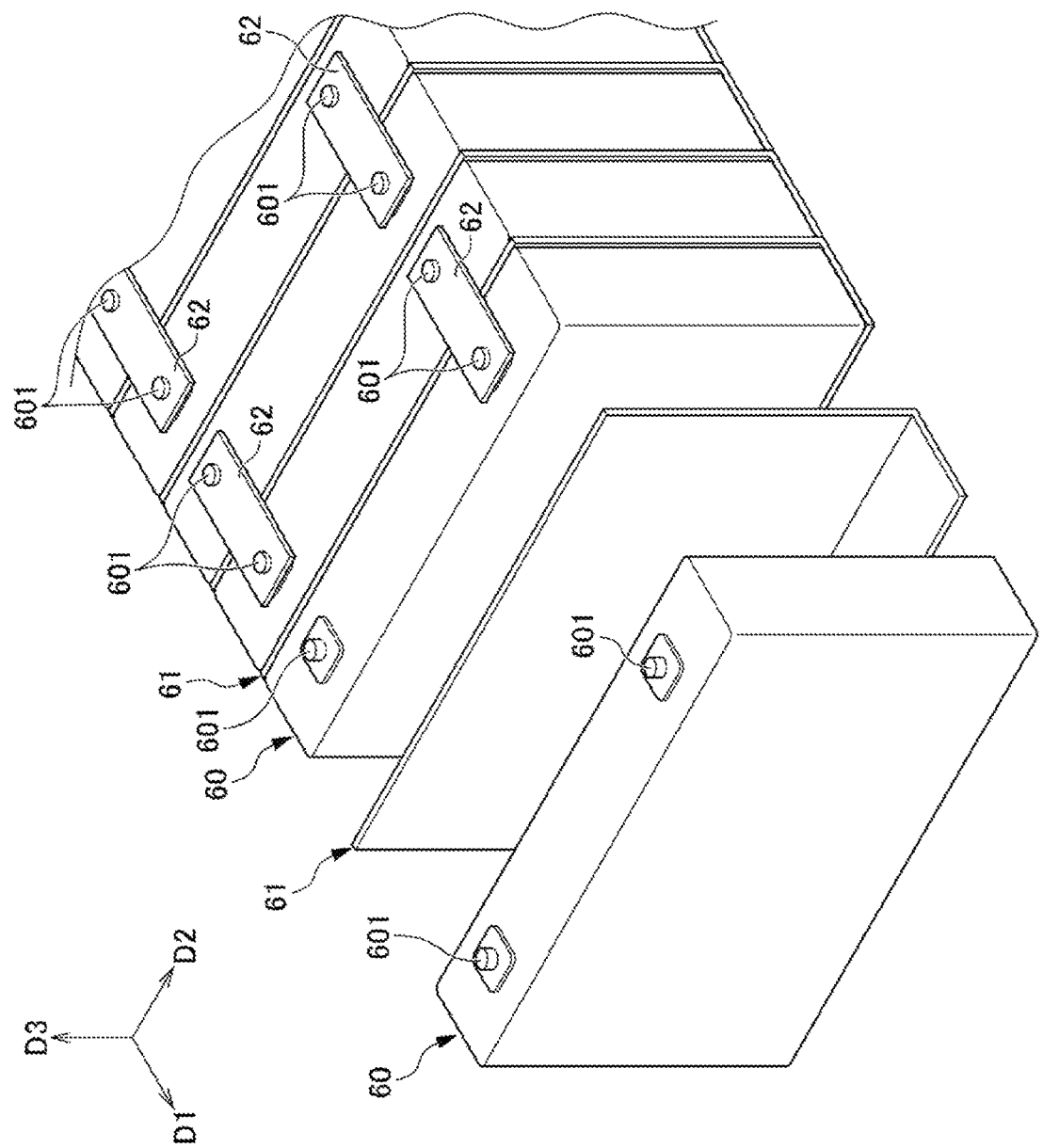
FIG. 9 is a perspective view showing a battery cell accommodated in a battery cell mounting part.

As shown in FIG. 3 and FIG. 9, the battery cell group 6 is configured by laminating a plurality of cuboid-shaped battery cells 60 made of, for example, lithium ion secondary batteries, along the direction D1. An insulating separator 61 is arranged between the battery cells 60 and 60 adjacent to each other in the lamination direction and is sandwiched between the adjacent battery cells 60 and 60. The battery cell 60 is configured by accommodating an electrode body in a cell case made of aluminum, aluminum alloy or the like, and has a pair of positive and negative electrode terminals 601 on an upper surface thereof. The electrode terminals 601 of the two battery cells 60 and 60 adjacent to each other in the lamination direction are electrically connected by a bus bar 62. Accordingly, all the battery cells 60 of the battery cell group 6 are electrically connected in series or in parallel. The present embodiment shows a case where all the battery cells 60 are electrically connected in series.

A state detection part 63 for detecting a battery state, such as a cell voltage sensor (CVS) detecting a voltage of the battery cell 60, or the like, is arranged on an upper surface of the battery cell group 6. A cover 64 covering all the battery cells 60 of the battery cell group 6 is arranged around the state detection part 63 to protect the electrode terminal 601 and the like arranged on the upper surface. Electrical wires (not shown) electrically connected to each battery cell 60 of the battery cell group 6 are also covered by the cover 64. However, on the side near the I/F box 2, the electrical wires are exposed to the outside from the cover 64 and inserted through the electrical wiring openings 205 provided in the I/F box 2.

The battery cell group 6 in the state in which a plurality of battery cells 60 and separators 61 are laminated is inserted into the exterior body 30 while sliding from the side of the end surface 30b of the exterior body 30 far from the I/F box 2. At this moment, in order to maintain the laminated state of each battery cell 60 at the time of insertion, each battery cell 60 of the battery cell group 6 may be simply bound by a binding band (not shown) or the like and integrated.

A side surface of each battery cell 60 of the battery cell group 6 in the exterior body 30 contacts an inner surface of the sidewall 33 on which the temperature control solution passage 36 is provided so as to exchange heat therewith via a heat transfer sheet (not shown). Accordingly, each battery cell 60 is efficiently heat-exchanged with the temperature control solution flowing through the temperature control solution passage 36 and temperature-controlled.

The battery cell group 6 accommodated in the exterior body 30 is compressed and sandwiched between the end plate 4 and the side surface 201a of the I/F box 2 in the lamination direction of the battery cells 60. Accordingly, expansion of the battery cells 60 is suppressed. In the present embodiment, as shown in FIG. 2 and FIG. 3, one common end plate 4 is used by the two battery cell groups 6 and 6 arranged in parallel in the exterior body 30. Therefore, each battery cell 60 of the two battery cell mounting parts 3 and 3 arranged to sandwich the I/F box 2 is integrally compressed and sandwiched between the end plates 4, 4 and the I/F box 2.

The end plate 4 is formed of a rigid body such as metal such as aluminum, aluminum alloy or the like, resin such as an engineering plastic or the like, or a composite of these metals and resins. The end plate 4 may have a return passage (not shown) of the temperature control solution passage that communicates with the temperature control solution passage 36. For example, the return passage is provided so as to communicate the temperature control solution passages 36 and 36 of the two sidewalls 33 and 33 with each other. Accordingly, as shown by solid arrows in FIG. 2, the temperature control solution can circulate between the I/F box 2 and each of the battery cell mounting parts 3 and 3, and it becomes possible to further improve temperature control efficiency. In addition, the return passage may be provided, for example, on a surface in contact with the end surface 30b of the exterior body 30 so as to communicate the upper passage 361 and the lower passage 362 of the temperature control solution passage 36 of one sidewall 33 with each other.

In the vehicle battery device 1, the battery cell group 6 of the battery cell mounting part 3 connected to the I/F box 2 is electrically connected to the low voltage connector 24 and the high voltage connector 25 by the electrical wires (not shown) via the component 22 in the I/F box 2. Meanwhile, the temperature control solution passage 36 provided in the exterior body 30 of the battery cell mounting part 3 is similarly connected to the temperature control solution connector 26 via the component 22 so as to be capable of circulating the temperature control solution. In addition, instead of via the component 22, the temperature control solution passage 36 may pass through the inside of the sidewall parts 201, 202 and 203 of the I/F box 2 and be connected to the temperature control solution connector 26 so as to be capable of circulating the temperature control solution. In FIG. 2, the flow of electricity of the vehicle battery device 1 is schematically shown by blank arrows, and the flow of the temperature control solution is schematically shown by the solid arrows. Accordingly, the electrical function of the laminated battery cells 60 accommodated in the battery cell mounting part 3 and the circulation function of the temperature control solution are integrated in the interface box 2.

Since functional wiring and passage connection between the I/F box 2 and the battery cell mounting part 3 are all completed by connection to the low voltage connector 24, the high voltage connector 25 and the temperature control solution connector 26, and there is no need to perform other electrical connection or connection for circulating the temperature control solution, the vehicle battery device 1 can be configured compactly. In addition, in the vehicle battery device 1, since all the connections with the outside can be performed via the I/F box 2, connection with the outside also becomes easy.

Figure 10:
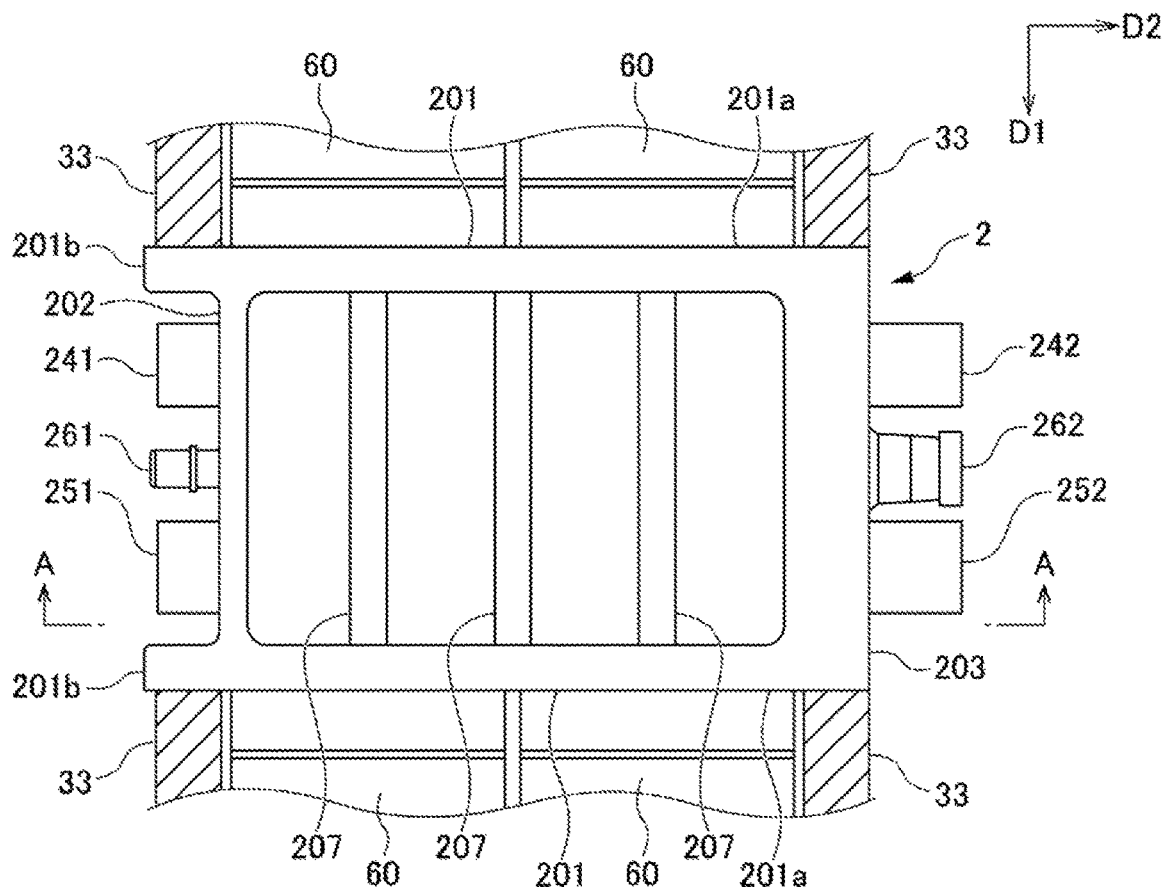
FIG. 10 is a plan view showing the inside of an I/F box to which a battery cell mounting part is connected.
Figure 11:
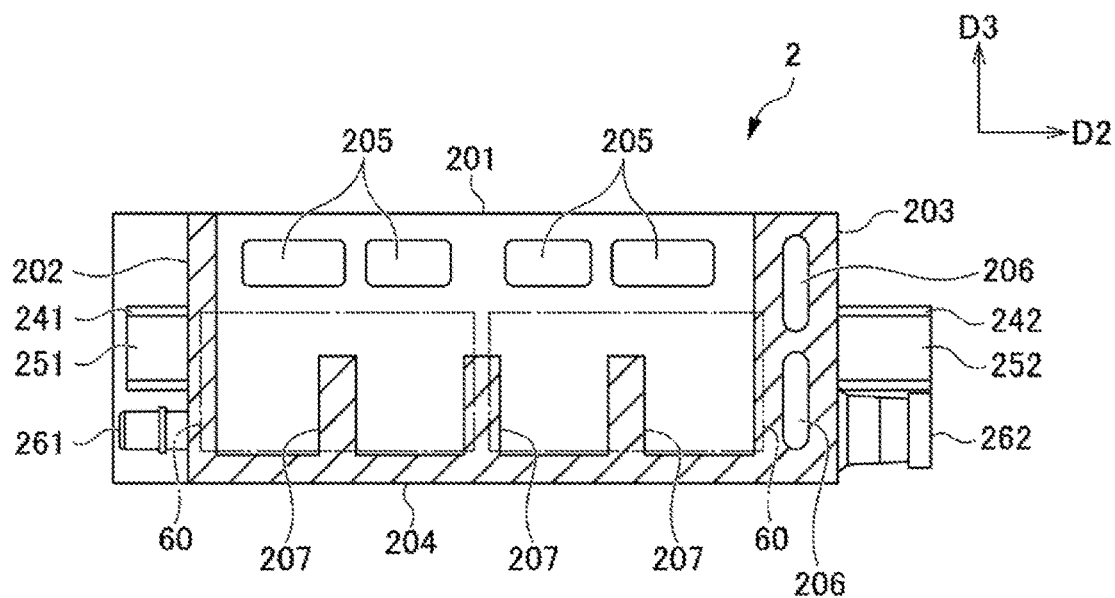
FIG. 11 is a cross-sectional view taken along line A-A in FIG. 10.

Since the sidewall part 201 of the I/F box 2 compresses and sandwiches the battery cell group 6 accommodated in the battery cell mounting part 3 with the end plate 4, the sidewall part 201 directly receives stress during expansion of the battery cells 60 constituting the battery cell group 6. While the sidewall part 201 is configured to have sufficient rigidity against this stress, as shown in FIG. 10 and FIG. 11, a beam part 207 may be provided in the I/F box 2. The beam part 207 is provided over between the two sidewall parts 201 and 201 inside the I/F box 2. That is, the beam part 207 is arranged between the two opposing side surfaces 201*a* and 201*a* connected with the battery cell mounting parts 3 and 3. Since the beam part 207 is provided to connect the sidewall parts 201 and 201 of the I/F box 2 with each other, strength of the I/F box 2 along the connection direction (direction along the direction D1) of the battery cell mounting parts 3 and 3 can be enhanced, and durability against the stress acting on the sidewall part 201 during expansion of the battery cells 60 can be improved.

In the present embodiment, three beam parts 207 are provided in parallel along the direction D2 in the I/F box 2. Since the middle beam part 207 is arranged in a central part along the direction D2 in the I/F box 2, the sidewall parts 201 and 201 can be efficiently supported. In addition, as shown by dot-and-dash lines in FIG. 11, the other two beam parts 207 are arranged in positions corresponding to a central part of the battery cell group 6 in the battery cell mounting part 3 in a width direction, the battery cell mounting part 3 being connected to the I/F box 2. Hence, the beam parts 207 are capable of further improving the durability against the stress applied to the side surface 201*a* of the I/F box 2 due to the expansion of the battery cells 60.

Although the beam part 207 shown in the present embodiment is provided so as to integrally extend upward from the bottom wall part 204 of the I/F box 2, the disclosure is not limited thereto as long as the beam part 207 does not affect the arrangement of the component 22 in the I/F box 2. For example, the beam part 207 may be formed separately from the I/F box 2 and be attached and fixed in the I/F box 2. In addition, the beam part 207 may only be bridged between the two sidewall parts 201 and 201, like a tension rod, without contacting the bottom wall part 204.

Figure 12:
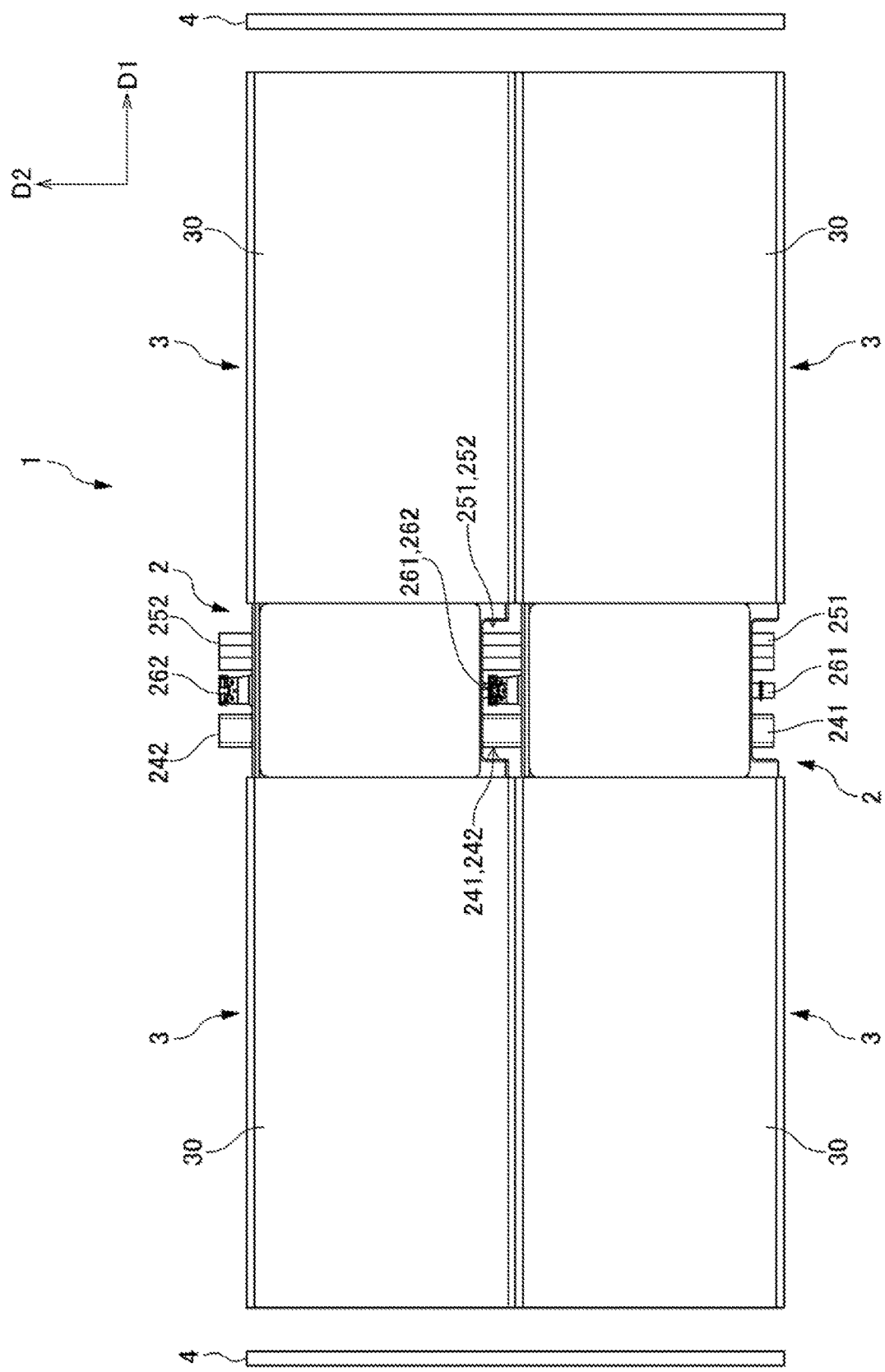
FIG. 12 is a plan view of a vehicle battery device showing a state in which I/F boxes to which a battery cell mounting part is connected are connected to each other.

As shown in FIG. 12, the I/F boxes 2 and 2 connected to the battery cell mounting parts 3 and 3 may be connected to each other along the direction D2 at any outer surface of the I/F box 2 other than the side surfaces 201*a* and 201*a* connected with the battery cell mounting parts 3 and 3. In the present embodiment, at the outer surfaces of the sidewall parts 202 and 203 having the low voltage connector 24, the high voltage connector 25 and the temperature control solution connector 26 thereon, the I/F boxes 2 and 2 are connected to each other by using the low voltage connector 24, the high voltage connector 25 and the temperature control solution connector 26 as a connection part. Accordingly, the I/F boxes 2 and 2 can be easily connected to each other. In addition, since the low voltage connector 24, the high voltage connector 25 and the temperature control solution connector 26 are also used as the connection part, there is no need to separately provide the connection part, and the configuration of the vehicle battery device 1 can be simplified.

By connecting the low voltage connectors 24, the high voltage connectors 25 and the temperature control solution connectors 26 of the I/F boxes 2 and 2 to each other in this way, the I/F boxes 2 and 2 are electrically connected to each other, and mutual circulation of the temperature control solution via the temperature control solution connectors 26 and 26 is considered possible. Accordingly, only by connecting the I/F boxes 2 and 2 to each other, a plurality of vehicle battery devices 1 and 1 can be functionally integrated and the number of battery cells 60 can be easily increased. Hence, a large capacity vehicle battery device in which the battery cells 60 are arranged at high density can be easily configured.

The sidewall part 202 being one of the sidewall parts 202 and 203 in the I/F box 2 is arranged in a position slightly more inward (toward the sidewall part 203) than end parts (lower end parts in FIGS. 6) 201*b* and 201*b* of the two sidewall parts 201 and 201 connected with the battery cell mounting parts 3 and 3. That is, the end parts 201*b* and 201*b* in the two sidewall parts 201 and 201 near the sidewall part 202 protrude further than the sidewall part 202 in a direction opposite the direction D2. Hence, when the I/F boxes 2 and 2 are connected to each other, as shown in FIG. 12, connected portions of each of the connectors 24, 25 and 26 are accommodated between the end parts 201*b* and 201*b* of the two sidewall parts 201 and 201 and between the sidewall parts 202 and 203 of the adjacent I/F boxes 2 and 2. Accordingly, the battery cell mounting parts 3 and 3 adjacent to each other in a connection direction can approach or abut against each other as much as possible, and a load applied to the connected portions can be reduced.

As shown in FIG. 12, the battery cell mounting parts 3 and 3 made adjacent to each other in the direction D2 due to the connection between the I/F boxes 2 and 2 may be compressed and sandwiched between the sidewall parts 201 and 201 of the I/F box 2 by the one common end plate 4. By the adjacent battery cell mounting parts 3 and 3 sharing the end plate 4, the number of the end plate 4 can be reduced. In addition, since the adjacent battery cell mounting parts 3 and 3 are integrally fixed by the end plate 4, the connection state between the I/F boxes 2 and 2 is also maintained. Hence, the load applied to the connected portions of each of the connectors 24, 25 and 26 can further be reduced.

Figure 13:
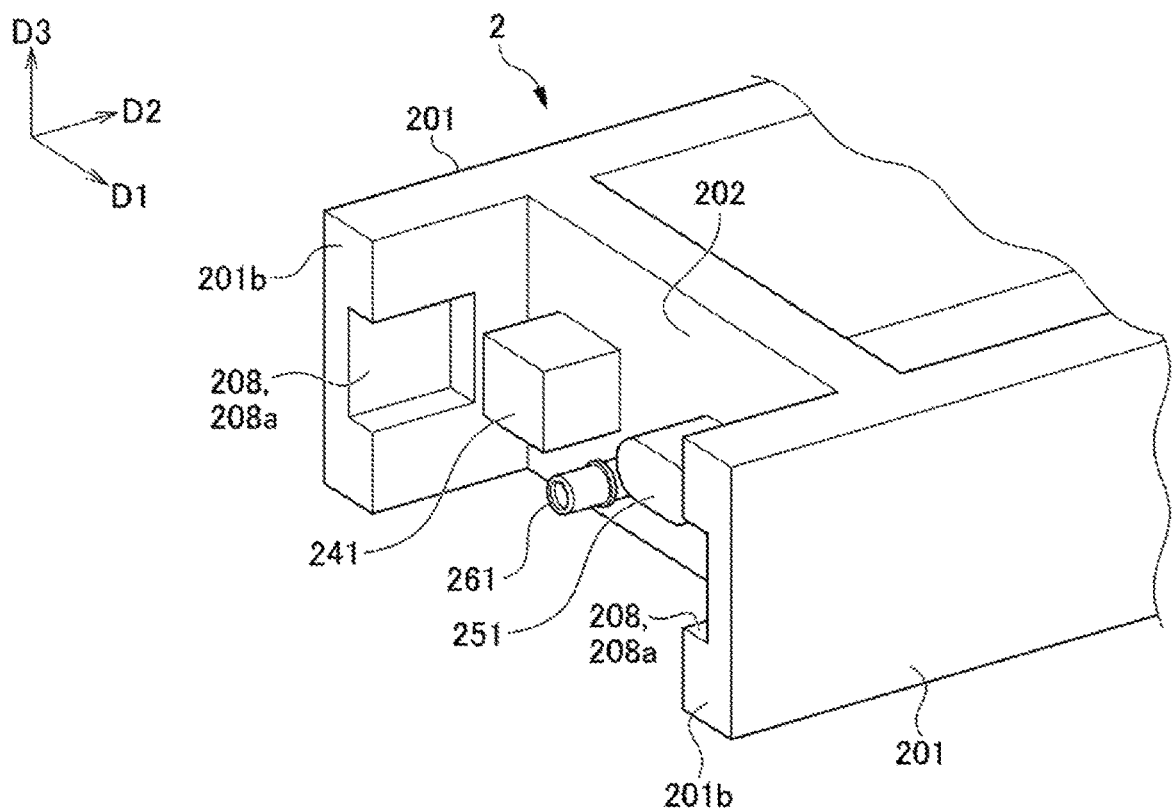
FIG. 13 is a perspective view of principal parts of an I/F box having a positioning mechanism as seen from a front side.
Figure 14:
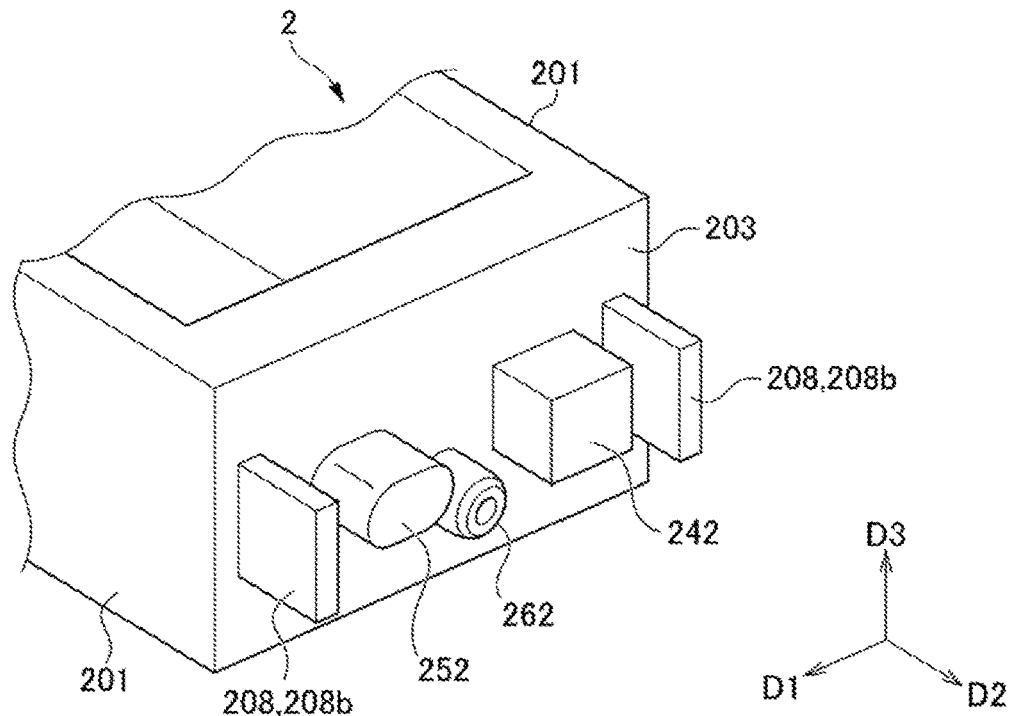
FIG. 14 is a perspective view of principal parts of an I/F box having a positioning mechanism as seen from a back side.
Figure 15:
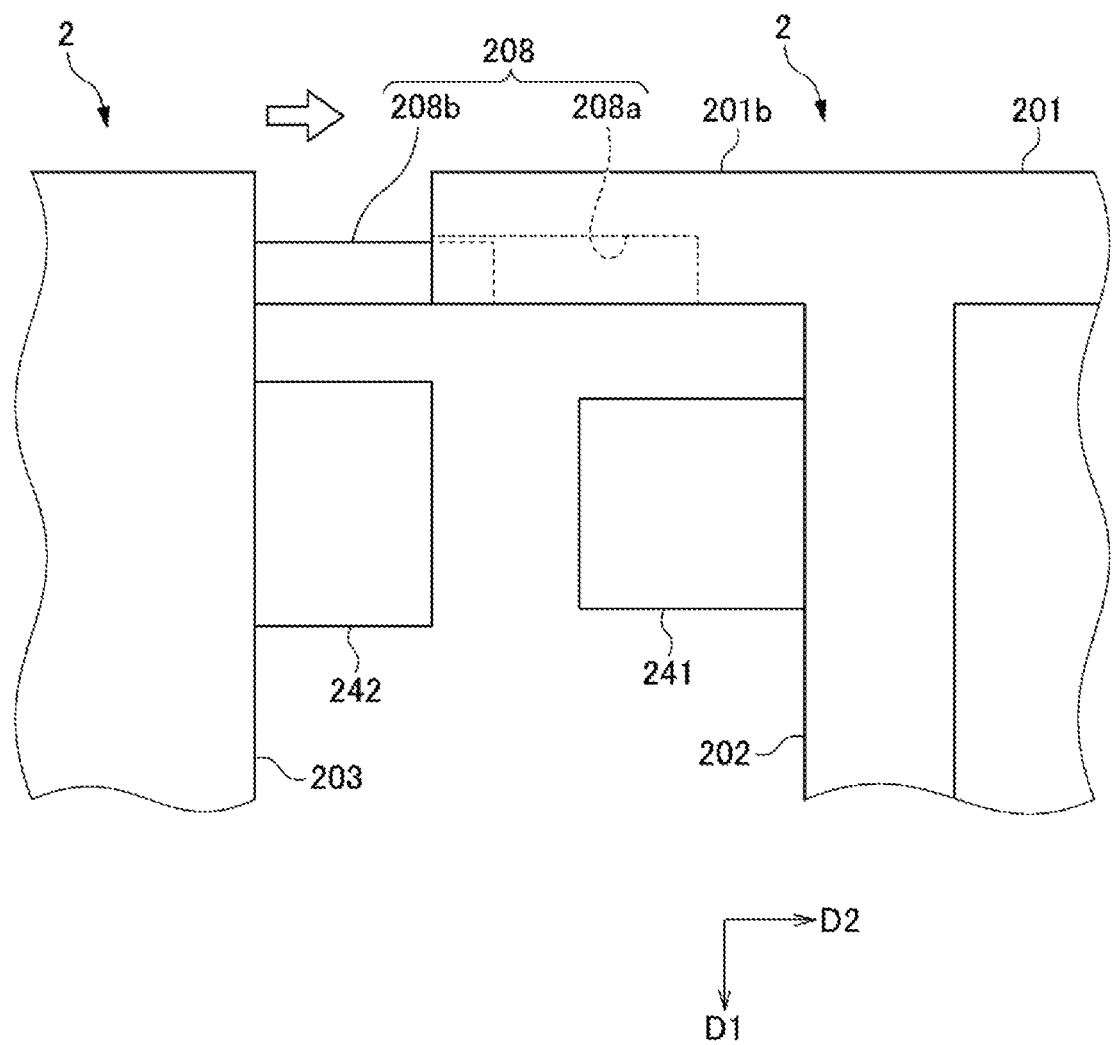
FIG. 15 is an explanatory view for explaining a state of positioning of I/F boxes by a positioning mechanism.

In order to more suitably perform such connection between the I/F boxes 2 and 2, as shown in FIG. 13 to FIG. 15, the I/F box 2 may have, on any outer surface other than the side surfaces 201a and 201a connected with the battery cell mounting parts 3 and 3, a positioning mechanism 208 separate from the connection part and for positioning the I/F boxes 2 and 2. The positioning mechanism 208 is arranged on each of the end part 201b of the sidewall part 201 of the I/F box 2 and the sidewall part 203 on the back side of the end part 201b.

Specifically, inside the end parts 201b and 201b of the sidewall parts 201 and 201 of the I/F box 2 (i.e., the side where the low voltage connector 24, the high voltage connector 25 and the temperature control solution connector 26 are arranged), a pair of recessed groove parts 208a recessed at a predetermined depth are respectively provided along the direction D2. Meanwhile, on the sidewall part 203 of the I/F box 2, a pair of protruding parts 208b are respectively provided outside the low voltage connector 24 and the high voltage connector 25. A protrusion height of the protruding part 208b corresponds to a recess depth of the recessed groove part 208a. A distance between the pair of protruding parts 208b corresponds to a distance between the pair of recessed groove parts 208a. A width of the protruding part 208b along the direction D3 corresponds to a groove width of the recessed groove part 208a along the direction D3. Accordingly, the recessed groove part 208a and the protruding part 208b have a complementary relationship, and the recessed groove part 208a is configured so that the protruding part 208b can be fitted thereto along the connection direction (direction along the direction D2).

Hence, when the I/F boxes 2 and 2 are connected to each other, as shown in FIG. 15, by fitting the protruding part 208b into the recessed groove part 208a, the I/F boxes 2 and 2 are positioned in up-down and left-right directions, and it becomes easier to connect the I/F boxes 2 and 2 to each other. Moreover, since the positioning mechanism 208 is separate from the connection part and positioning by the connection part is not necessary, when the I/F boxes 2 and 2 are connected to each other, a load applied to the connection part (the low voltage connector 24, the high voltage connector 25 and the temperature control solution connector 26) can be reduced.

The recessed groove part 208a and the protruding part 208b of the positioning mechanism 208 are provided more protruding than the low voltage connector 24, the high voltage connector 25 and the temperature control solution connector 26 being the connection part along the connection direction of the I/F boxes 2 and 2. Hence, as shown in FIG. 15, when the I/F boxes 2 and 2 are connected to each other, the recessed groove part 208a and the protruding part 208b can make contact earlier than the low voltage connector 24, the high voltage connector 25 and the temperature control solution connector 26. Accordingly, since the I/F boxes 2 and 2 are positioned by the positioning mechanism 208 before the low voltage connector 24, the high voltage connector 25 and the temperature control solution connector 26 respectively make contact, there is no risk of applying a load to the connection part, and the connection operation can be more smoothly performed.

Figure 16:
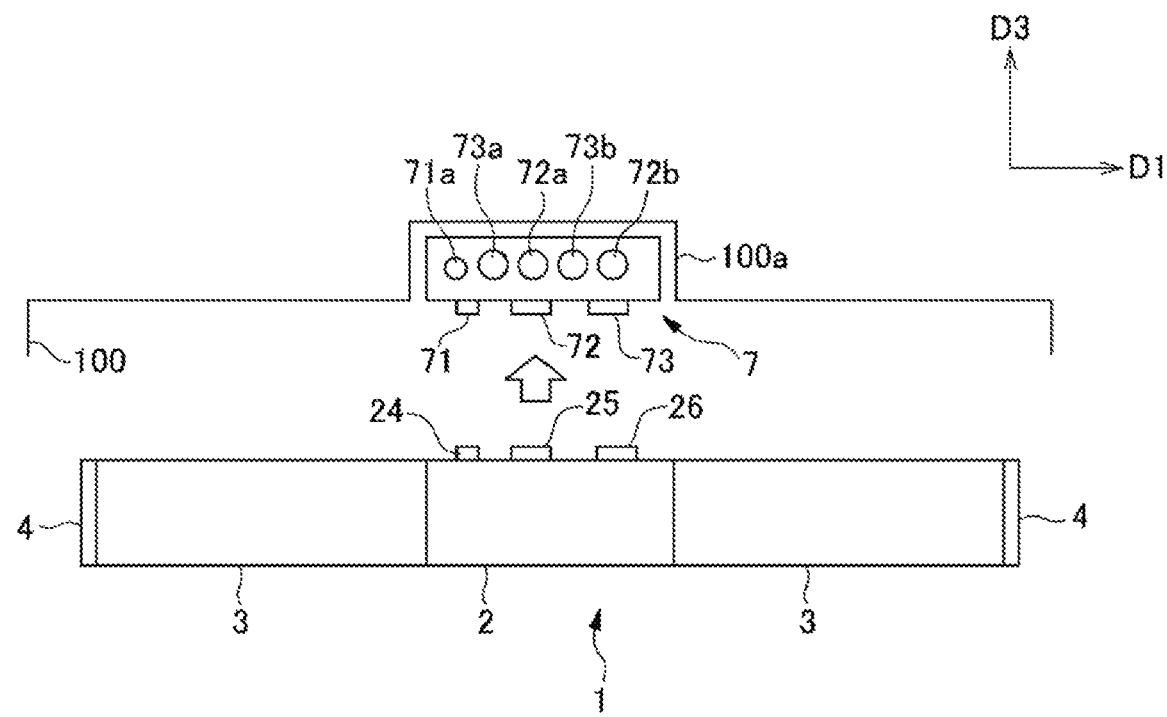
FIG. 16 is a front view showing an embodiment of a vehicle battery device having a storage body.

As another method of configuring the vehicle battery device 1 in which a plurality of I/F boxes 2 and 2 are functionally connected to each other, as shown in FIG. 16, the I/F boxes 2 and 2 can also be functionally connected to each other using a storage body 7 separate from the I/F box 2. The storage body 7 is a housing made of metal such as aluminum, aluminum alloy or the like, and is arranged, for example, in a center tunnel 100a of a floor part 100 of a vehicle.

On a lower surface of the storage body 7, a plurality of low voltage input/output connectors 71 connectable with the low voltage connector 24 of the I/F box 2, a plurality of high voltage input/output connectors 72 connectable with the high voltage connector 25 of the I/F box 2, and a plurality of temperature control solution input/output connectors 73 connectable with the temperature control solution connector 26 of the I/F box 2 are provided. The low voltage input/output connector 71 and the high voltage input/output connector 72 are electrically connected with connection wires 71a, 72a and 72b arranged in the storage body 7. The temperature control solution input/output connector 73 is connected with temperature control solution pipes 73a and 73b arranged in the storage body 7 so as to be capable of circulating the temperature control solution. The temperature control solution pipe 73a is a pipe for supplying the temperature control solution, and the temperature control solution pipe 73b is a pipe for returning the temperature control solution.

A plurality of the I/F boxes 2 respectively connected to the battery cell mounting parts 3 and 3 are connected from the lower surface side of the storage body 7. In this case, the low voltage connector 24, the high voltage connector 25 and the temperature control solution connector 26 being the connection part of the I/F box 2 may be provided on the upper surface (cover body 21) of the I/F box 2. Since the storage body 7 integrates the electrical and temperature control functions of each I/F box 2, only by connecting a plurality of the I/F boxes 2 to one storage body 7, the number of the battery cells 60 can be easily increased, and further, the vehicle battery device 1 in which a large number of the battery cells 60 are arranged at high density can be easily configured.

Figure 17:
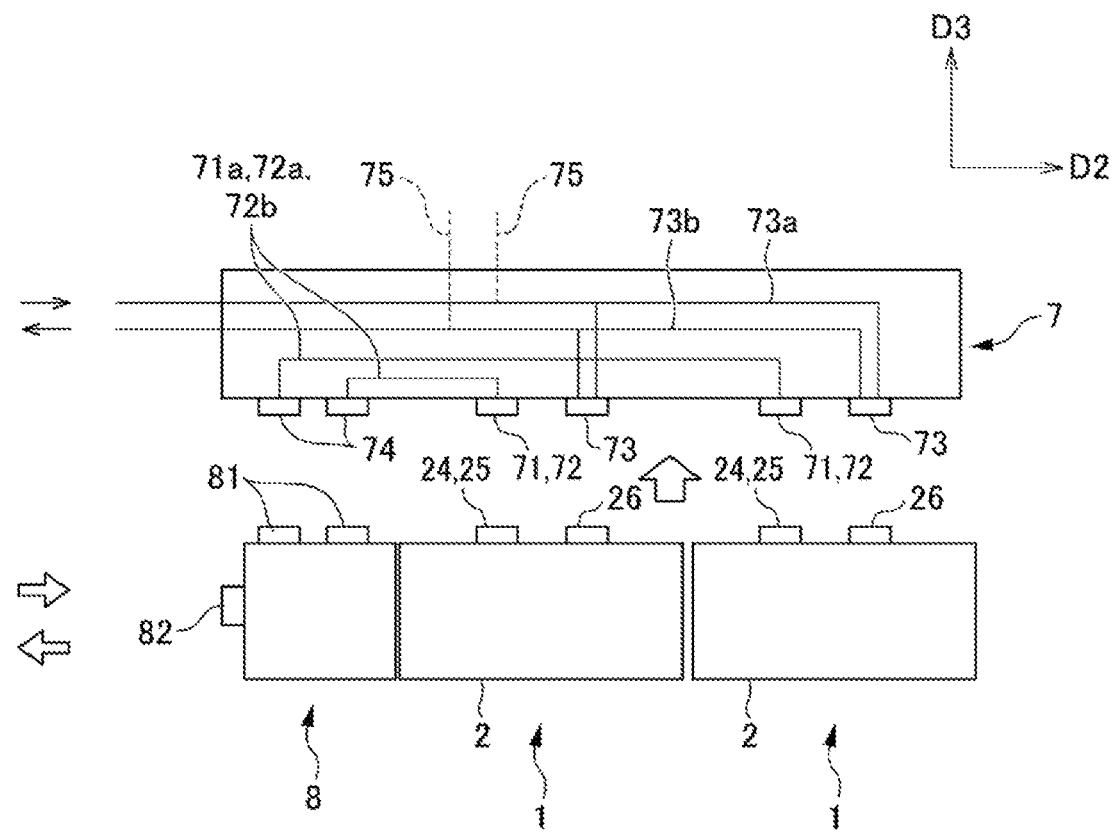
FIG. 17 is an explanatory view for explaining a state in which a plurality of I/F boxes are connected to a storage body.

Since the storage body 7 is arranged above the I/F boxes 2, the temperature control solution pipes 73a and 73b in the storage body 7 may have an air bubble removal part 75 for removing air bubbles in the temperature control solution, as shown in FIG. 17. Accordingly, since the air bubbles in the temperature control solution can be removed by the storage body 7, the vehicle battery device 1 having good temperature control efficiency can be configured.

Moreover, the lower surface of the storage body 7 shown in FIG. 17 further has thereon a connection connector 74 electrically connected with the connection wires 71a, 72a and 72b in the storage body 7. A collecting and branch box 8 is connected to the connection connector 74 so as to be in parallel with the I/F box 2. In the vehicle battery device 1, the collecting and branch box 8 is a portion further integrating the connection wires 71a, 72a and 72b integrated in the storage body 7 and serving as an interface connected with an external device (not shown). On an upper surface of the collecting and branch box 8, a connector 81 for connection with the connection connector 74 of the storage body 7 is provided. In addition, on a side surface of the collecting and branch box 8, a connector 82 for connection with the external device is provided.

Figure 18:
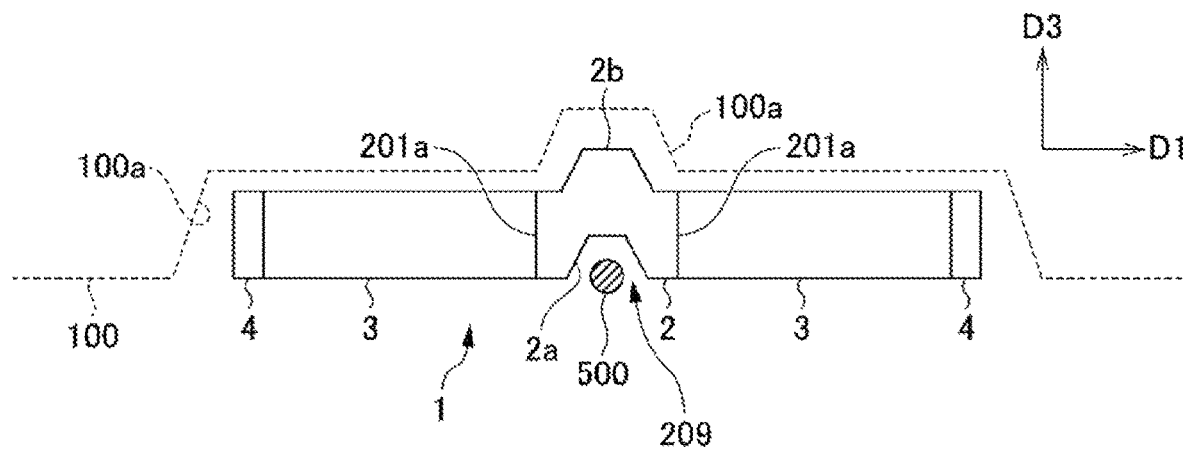
FIG. 18 is a front view showing an embodiment of a vehicle battery device including an I/F box having a fragile part.

FIG. 18 shows another embodiment of the vehicle battery device 1 mounted on the floor part 100 of the vehicle. The I/F box 2 of the vehicle battery device 1 has a fragile part 209 between the two opposing side surfaces 201a and 201a connected with the battery cell mounting parts 3 and 3. The fragile part 209 is a portion that is broken or deformed preferentially to the battery cell mounting part 3 when a load of a certain magnitude or greater acts from the outside along the connection direction (direction along the direction D1) of the battery cell mounting part 3. That is, a load capacity of the I/F box 2 having the fragile part 209 is smaller than a load capacity of the battery cell mounting part 3 (exterior body 30). By the I/F box 2 having such fragile part 209, when a collision load or the like acts on the I/F box 2 along the connection direction of the battery cell mounting part 3, since the vehicle battery device 1 is broken or deformed preferentially at the fragile part 209 of the I/F box 2, the load can be prevented from acting directly on the battery cell mounting part 3 and the battery cell 60 of the battery cell mounting part 3 can be protected.

The vehicle battery device 1 shown in FIG. 18 is arranged on a lower surface of the floor part 100 of the vehicle. The fragile part 209 of the I/F box 2 is formed by a concave part 2a. The concave part 2a is formed by retracting the lower surface of the I/F box 2 upward along the width direction (direction D2). Hence, when the load acts along the connection direction of the battery cell mounting part 3, the concave part 2a becomes partially fragile and can be broken or deformed preferentially to the battery cell mounting part 3. Moreover, as shown in FIG. 18, since a vehicle wire or pipe 500 arranged along the center tunnel 100a of the floor part 100 can be inserted through the concave part 2a, utilization efficiency of vehicle space can also be enhanced.

Figure 19:
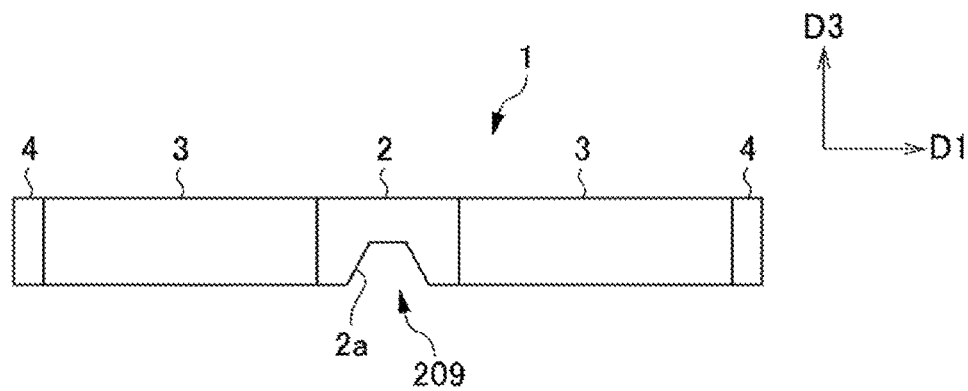
FIG. 19 is a front view showing an embodiment of a vehicle battery device including an I/F box having a fragile part.

Moreover, the I/F box 2 shown in FIG. 18 has a convex part 2b that is convex upward along the center tunnel 100a. The concave part 2a is formed by causing the upper surface of the I/F box 2 to protrude upward along the width direction. Hence, by providing the convex part 2b, a decrease in capacity of the I/F box 2 due to the formation of the concave part 2a can be compensated for. However, the convex part 2b may not necessarily be provided. That is, as shown in FIG. 19, the I/F box 2 may have only the concave part 2a on the lower surface side.

Figure 20:
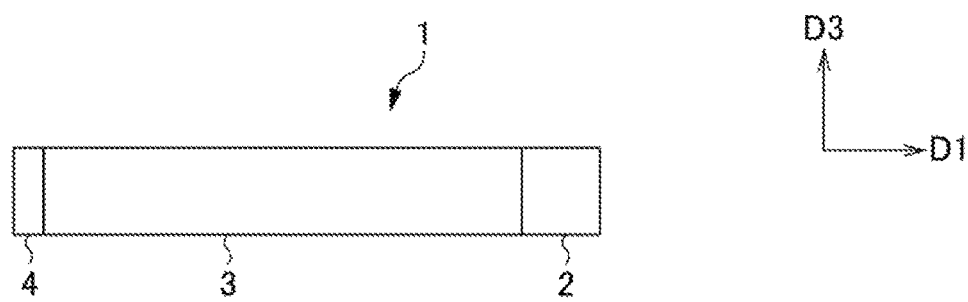
FIG. 20 is a front view showing another embodiment of a vehicle battery device according to the disclosure.

In the vehicle battery device 1 shown in the above embodiment, the two battery cell mounting parts 3 and 3 are provided with the I/F box 2 sandwiched therebetween. However, the battery cell mounting part 3 may be provided on only one side of the I/F box 2, as shown in FIG. 20. The above-mentioned fragile part 209 may be provided in the I/F box 2 in this case.

What is claimed is:

1. A vehicle battery device comprising: a battery cell mounting part accommodating a battery cell group constituted by a plurality of laminated battery cells; and an interface box integrating connection functions between the battery cell mounting part and the outside, wherein
   the battery cell mounting part is connected to at least one of two opposing side surfaces in an outer surface of the interface box; and
   the interface box has, on any of the outer surface other than the at least one of the two opposing side surfaces connected with the battery cell mounting part, a connection part capable of connecting the interface box to another interface box, and an interface part for connection with the outside, wherein
   the connection part is constituted by the interface part.

2. The vehicle battery device according to claim 1, wherein the interface box has, on any of the outer surface other than the at least one of the two opposing side surfaces connected with the battery cell mounting part, a positioning mechanism separate from the interface part and for positioning the interface box and the another interface box.

3. The vehicle battery device according to claim 2, wherein the positioning mechanism is provided more protruding than the interface part in a connection direction of the interface box and the another interface box.

4. The vehicle battery device according to claim 3, wherein
   the battery cell mounting part has a temperature control solution passage through which a temperature control solution circulates along a lamination direction of the plurality of laminated battery cells;
   the interface part comprises a power interface part transmitting and receiving electricity, and a temperature control solution interface part transmitting and receiving the temperature control solution;
   the battery cell group of the battery cell mounting part is electrically connected to the power interface part; and
   the temperature control solution passage of the battery cell mounting part is connected to the temperature control solution interface part so as to be capable of circulating the temperature control solution.

5. The vehicle battery device according to claim 2, wherein
   the battery cell mounting part has a temperature control solution passage through which a temperature control solution circulates along a lamination direction of the plurality of laminated battery cells;
   the interface part comprises a power interface part transmitting and receiving electricity, and a temperature control solution interface part transmitting and receiving the temperature control solution;
   the battery cell group of the battery cell mounting part is electrically connected to the power interface part; and
   the temperature control solution passage of the battery cell mounting part is connected to the temperature control solution interface part so as to be capable of circulating the temperature control solution.

6. The vehicle battery device according to claim 1, wherein
   the battery cell mounting part has a temperature control solution passage through which a temperature control solution circulates along a lamination direction of the plurality of laminated battery cells;
   the interface part comprises a power interface part transmitting and receiving electricity, and a temperature control solution interface part transmitting and receiving the temperature control solution;
   the battery cell group of the battery cell mounting part is electrically connected to the power interface part; and
   the temperature control solution passage of the battery cell mounting part is connected to the temperature control solution interface part so as to be capable of circulating the temperature control solution.

7. The vehicle battery device according to claim 6, wherein the temperature control solution interface part is arranged below the power interface part or in a position spaced apart from the power interface part in a horizontal direction.

8. The vehicle battery device according to claim 1, wherein
   the battery cell mounting part has an end plate on an end surface opposite an end surface connected to the interface box; and
   the battery cell group of the battery cell mounting part is compressed and sandwiched between the at least one of the two opposing side surfaces of the interface box and the end plate in a lamination direction of the plurality of laminated battery cells.

9. The vehicle battery device according to claim 8, wherein the at least one of the two opposing side surfaces of the interface box connected with the battery cell mounting part is a flat surface.

10. The vehicle battery device according to claim 8, wherein the end plate has a return passage of a temperature control solution passage that communicates with a temperature control solution passage of the battery cell mounting part.

11. The vehicle battery device according to claim 1, wherein the at least one of the two opposing side surfaces of the interface box connected with the battery cell mounting part has, separately, an electrical wiring opening through which an electrical wire provided over between the battery cell mounting part and the interface box can be inserted, and a temperature control solution opening communicable with a temperature control solution passage of the battery cell mounting part.

12. The vehicle battery device according to claim 11, wherein the temperature control solution opening is provided in a position corresponding to one end part of the temperature control solution passage of the battery cell mounting part.

13. The vehicle battery device according to claim 11, wherein
the battery cell mounting part has above the battery cell group a space part in which the electrical wire can be arranged; and
the electrical wiring opening is provided in a position corresponding to the space part of the battery cell mounting part.

14. The vehicle battery device according to claim 1, wherein a beam part extending between the two opposing side surfaces is provided inside the interface box.

15. The vehicle battery device according to claim 14, wherein the beam part is arranged in a position corresponding to a central part of the battery cell group in the battery cell mounting part in a width direction.

16. The vehicle battery device according to claim 1, wherein the interface box has, between the two opposing side surfaces, a fragile part that is broken or deformed preferentially to the battery cell mounting part when a load acts from the outside.

17. The vehicle battery device according to claim 16, wherein the fragile part is a concave part through which a vehicle wire or pipe can be inserted.

18. The vehicle battery device according to claim 1, wherein the battery cell mounting part and another battery cell mounting part are connected to the two opposing side surfaces of the interface box respectively.

19. The vehicle battery device according to claim 1, wherein
the battery cell mounting part has an end plate on an end surface opposite an end surface connected to the interface box; and
the battery cell group of the battery cell mounting part is compressed and sandwiched between the at least one of the two opposing side surfaces of the interface box and the end plate in a lamination direction of the plurality of laminated battery cells.

* * * * *